United States Patent [19]

Pears

[11] 4,391,767

[45] * Jul. 5, 1983

[54] COATED POLYESTER FILMS

[75] Inventor: Gordon E. A. Pears, Welwyn Garden City, England

[73] Assignee: Imperial Chemical Industries PLC, London, England

[ * ] Notice: The portion of the term of this patent subsequent to Jun. 25, 1991, has been disclaimed.

[21] Appl. No.: 188,144

[22] Filed: Sep. 17, 1980

Related U.S. Application Data

[60] Continuation of Ser. No. 954,772, Oct. 16, 1978, abandoned, which is a continuation of Ser. No. 741,997, Nov. 15, 1976, abandoned, which is a continuation of Ser. No. 257,297, May 26, 1972, abandoned, which is a division of Ser. No. 52,763, Jul. 6, 1970, abandoned.

[30] Foreign Application Priority Data

Jul. 15, 1969 [GB] United Kingdom ............... 35556/69

[51] Int. Cl.$^3$ ....................... D01F 13/04; D01F 11/08
[52] U.S. Cl. .................................. 264/210.3; 264/37; 264/129; 264/141; 264/171; 264/210.7; 264/290.2; 427/173; 427/345; 428/483
[58] Field of Search ................ 428/483; 427/173, 345; 264/37, 129, 141, 171, 210 R, 289, 290 T, 290 R, 210.3, 210.7, 290.2; 521/48

[56] References Cited

U.S. PATENT DOCUMENTS

| | | | |
|---|---|---|---|
| 2,627,088 | 2/1953 | Alles et al. | 427/173 |
| 3,264,136 | 8/1966 | Hedge | 428/147 |
| 3,311,491 | 3/1967 | Reichardt et al. | 428/516 |
| 3,573,951 | 4/1971 | Abbott et al. | 428/483 |
| 3,607,975 | 9/1971 | Tsukada et al. | 525/163 |
| 3,616,191 | 10/1971 | Fuerholzer et al. | 161/190 |
| 3,703,488 | 11/1972 | Morton | 260/2.3 |
| 3,706,699 | 12/1972 | Conix et al. | 260/40 R |
| 3,751,280 | 8/1973 | Nesurkas et al. | 427/172 |
| 3,819,773 | 6/1974 | Pears | 264/210 R |
| 4,089,997 | 5/1978 | Van Paesschen et al. | 427/173 |

FOREIGN PATENT DOCUMENTS

| | | | |
|---|---|---|---|
| 256439 | 8/1967 | Austria . | |
| 862482 | 3/1961 | United Kingdom . | |
| 1127076 | 9/1968 | United Kingdom | 264/210 R |

Primary Examiner—Wilbert J. Briggs, Sr.
Attorney, Agent, or Firm—Cushman, Darby & Cushman

[57] ABSTRACT

Coating polyester films between the longitudinal and transverse drawing stages of the biaxial orientation process with a non-heat sealing primer coating which may be reclaimable.

9 Claims, No Drawings

COATED POLYESTER FILMS

This is a continuation of application Ser. No. 954,772, filed Oct. 16, 1978 (abandoned) as a continuation of application Ser. No. 741,997 filed Nov. 15, 1976 (now abandoned) as a continuation of application Ser. No. 257,297 filed May 26, 1972 (now abandoned) as a division of application Ser. No. 52,763 filed July 6, 1970 (now abandoned).

This invention relates to coated films of synthetic linear polyesters, particularly of polyesters derived essentially from ethylene glycol and terephthalic acid.

In our U.K. Specification No. 1,078,813 we describe and claim a process for the production of a heat seal coated, biaxially oriented synthetic linear polyester film comprising the steps of melt extruding a substantially amorphous film, drawing the film in the longitudinal direction, thereafter applying a heat seal coating to one or both sides of said film and further drawing the coated film in the transverse direction.

We have now found that a similar process can be used for the production of polyester films in which the polymer on which the coating is based is not a "heat sealable coating polymer" as defined in U.K. Specification No. 1,078,813.

Accordingly we provide a process for the production of coated biaxially oriented synthetic linear polyester films which comprises melt extruding a substantially amorphous polyester film, drawing the film in the longitudinal direction, thereafter applying a primer coating to one or both sides of said film and then drawing the coated film in the transverse direction, whereby a primer coating thickness of at least $10^{-7}$ inch is obtained.

The primer coatings of the present invention do not in themselves confer heat sealability to the base film. They do, however, alter the surface properties of the film and make it more receptive to subsequent coating, printing, metallising or other treatment. For example, the primer coatings provide an excellent basis on to which a layer of a vapour impermeable coating, e.g. of vinylidene chloride/acrylonitrile copolymer, a lacquer containing a matting agent (to produce a coated film suitable for drawing office applications) or a gelatin based coating may be applied. The latter is a particularly useful application of our invention since most photographic films are built up on one or more layers of coatings based on gelatin, and the present invention provides a method whereby the hydrophobic base film can be made to adhere to the hydrophilic gelatin based layer. The primer coatings may additionally be employed to render the polyester film receptive to "heat sealable coating polymers" as disclosed for example in U.K. Specification No. 1,078,813.

Alternatively a coating may be applied which consists of discrete particles of polymer or of inorganic materials, this coating improving the slip properties of the surface of the film. Our invention may also be used for the application of very thin layers of antistatic, antioxidant and UV stabilising agents.

The primer coating may have a thickness up to the greatest practical thickness which can be applied by the method of this invention (about $2.10^{-4}$ inch) of materials other than "heat sealable coating polymers" which materials include; vinylidene chloride copolymers containing more than 95% of vinylidene chloride; the reaction product of polyisocyanate and a polyhydric alcohol with a phenol described in our U.K. Specification No. 1,092,908; polyacrylic acid; polyurethanes e.g. as formed from polyisocyanate mixtures with polyesters or polyethers; the condensation product of a monoaldehyde with an interpolymer of acrylamide or methacrylamide with at least one other unsaturated monomer in the presence of an alkanol containing from one to six carbon atoms as described in our U.K. Specification No. 1,134,876; cellulose derivatives such as hydroxyethyl cellulose; materials containing active groups such as the acidic groups comprising sulphonic acid, phosphoric acid, carboxylic acid or their ionisable salts, nitrogenous basic groups or ionisable salts thereof, water-solvatable polymeric polyoxyalkylene groups, outer oxidant groups, groups which contain silicon- or fluorine-based water-repellant groups, polymeric groups containing a plurality of alcoholic hydroxyl radicals and polymeric groups containing a plurality of —CO—NH— radicals, as described in U.K. Specification No. 1,088,984; thermosetting acrylic or methacrylic compositions produced from polymers or copolymers of acrylic acid or methacrylic acid or their esters containing functional groups, such as hydroxy, carboxyl, amide and oxirane groups, and a condensation product of an amine, such as melamine, urea and diazines, or their derivatives, with formaldehyde, e.g. a composition based on polyethylacrylate and an amine/formaldehyde condensate; and methyl methacrylate/acrylic acid or methacrylic acid copolymers, e.g. those containing also ethyl acrylate and a ureido polymer complex.

Our preferred polyester is polyethylene terephthalate and films of this are oriented (as is well known) by stretching them at a temperature within the range of from 78° C. to 125° C.

Various known types of apparatus which are designed to stretch continuous lengths of film in the machine and transverse directions are suitable for use in the drawing processes of this invention. For example, the film may conveniently be drawn in the machine direction by passing it between or around a pair or a series of slow rollers which may be heated to the desired temperature and then between or around a pair or a series of fast rollers. A useful alternative method of heating the film is by means of radiant heat, applied to a small length of film between the fast and slow rollers. The film may be drawn in the transverse direction in a stenter apparatus. For drawing in a stenter, oven heating is preferred. We prefer to carry out the longitudinal drawing at a temperature of from 78° C. to 100° C. and the transverse drawing at a temperature of from 80° C. to 125° C., preferably 100° C. to 125° C.

The biaxially oriented and coated film may conveniently be heat set at a temperature ranging from 150° C. to 230° C.

The coating may be applied as a solution in an aqueous or organic solvent or as an aqueous dispersion. Those coating materials mentioned above may in particular be applied as a solution or aqueous dispersion. It is, of course, necessary to remove the organic solvent or the water in, for example, a drying oven and this may conveniently be combined with a pre-heating treatment of the film before transverse stretching.

Compositions comprising thermosetting acrylic or methacrylic materials, which are produced as described above from polymers or copolymers of acrylic acid or methacrylic acid or their esters which contain functional groups capable of cross-linking with condensation products of amines with formaldehyde, e.g. compositions based on polyethyl acrylate and an amine/formaldehyde condensate may be applied to the film as an aqueous latex. Such coating compositions are particularly useful since the coated film may be reclaimed without impairing the quality, colour and appearance of the film to an appreciable extent. It is possible to re-feed scrap coated film together with fresh polyester to the film forming extruder and to quench the extrudate in the normal manner to produce an amorphous film which may be oriented in one or more directions and heat set in known manner to provide a film in which any adverse properties introduced by the presence of the coating composition are insignificant. The re-extruded film may include up to about 1.0% by weight of the coating composition, preferably up to 0.5% by weight.

The coating compositions which are applied to the film may include in addition to the major constituent, antioxidants, dyes, pigments, lubricants, anti-blocking agents and/or slip agents, i.e. comminuted solids which are insoluble in the coating, e.g. starch, talc, zinc oxide, calcium carbonate, silica, titanium dioxide, triferric tetroxide, silicates, aluminates, alumino silicates.

Our invention is illustrated in no way limited by the following Examples. In each of these Examples a polyethylene terephthalate layer was melt extruded, cast on to a cooled rotating drum and drawn in the direction of extrusion to about 3.5 times its original length. It was then coated with aqueous dispersions as described in each of the Examples by a roller coating technique and, after coating was passed into a stenter oven where the coating was dried, the dried coated film then drawn sideways until it was about 3.5 times its original width and finally was heat set at a temperature of about 200° C.

EXAMPLE 1

An aqueous latex containing 6% by weight of a copolymer consisting of methyl methacrylate/ethyl acrylate/acrylic acid/ureido complex (33/64/2/1 parts by weight) was coated on to both sides of a film according to the above method, the coating on the biaxially drawn film being $5 \times 10^{-7}$ inch thick and the total thickness of the coated film being $3 \times 10^{-3}$ inch.

This coating showed excellent adhesion to matt lacquers.

EXAMPLE 2

An aqueous latex of the following composition was used, parts being calculated by weight:

| | |
|---|---|
| Hydroxy ethyl cellulose | 2 parts |
| U-F condensate hardener | 0.2 parts |
| sodium sesquicarbonate | 0.1 parts |
| Magnesium chloride | 0.2 parts |
| Nonyl phenol condensed with average of 8 moles ethylene oxide | 0.5 parts |
| Water | 97 parts |

Using the above described process this composition was applied to the film to give a finished film coat thickness of $5 \times 10^{-6}$ inch on both sides of the film which was of total thickness $3 \times 10^{-3}$ inch. The coated film had excellent antistatic properties.

EXAMPLE 3

An aqueous latex of the following composition was used, parts being calculated by weight:

| | |
|---|---|
| Thermosetting acrylic composition based on polyethyl acrylate and and amine/formaldehyde condensate | 9.5 parts |
| Poly(ethylene oxide - propylene oxide) emulsifier | 0.3 parts |
| Ammonia 4% aqueous solution | 0.2 parts |
| Water | 90 parts |

The process described above was used to apply this composition to the film in a final coat thickness of $2.4 \times 10^{-6}$ inch on both sides of the film which had a total thickness of $3 \times 10^{-3}$ inch.

The coated film was re-extruded with 75% by weight and 50% by weight of fresh polymer and drawn and heat set in the manner indicated above to make separate films. Comparative control films were also made by re-extruding uncoated film made by the process described above with 75% by weight and 50% by weight of fresh polymer and drawn and heat set by the above process. THe physical and mechanical properties were substantially unaffected by the presence of the coating material in the re-extruded film as shown by the following table, in which MD corresponds to the measurement of the property in the machine direction of the film; and TD corresponds to the measurement of the property in the transverse direction of the film

| | | Control 75% fresh polymer 25% uncoated film | Reclaim 75% fresh polymer 25% coated film | Control 50% fresh polymer 50% uncoated film | Reclaim 50% fresh polymer 50% coated film |
|---|---|---|---|---|---|
| Modulus (kg./mm$^2$) | - MD | 462 | 460 | 445 | 484 |
| | - TD | 542 | 432 | 468 | 532 |
| Yield Strength (lb./in$^2$) | - MD | 14,550 | 15,300 | 15,000 | 14,300 |
| | - TD | 14,300 | 15,900 | 15,500 | 14,350 |
| Breaking Strength (lb./in$^2$) | - MD | 23,200 | 24,850 | 22,900 | 24,100 |
| | - TD | 28,750 | 28,050 | 27,000 | 26,200 |
| $F_5$ (lb./in$^2$) | - MD | 13,000 | 13,500 | 13,500 | 12,750 |
| | - TD | 13,200 | 14,375 | 14,100 | 12,500 |
| Elongation % | - MD | 248 | 186 | 193 | 258 |
| | - TD | 204 | 173 | 166 | 185 |
| Shrinkage (%) | | 1.5 | 1.0 | 1.5 | 1.0 |
| Haze (%) | | 11.0 | 11.5 | 10.0 | 11.0 |
| Slip | | 0.40 | 0.38 | 0.35 | 0.33 |
| Intrinsic Viscosity | - film | 0.551 | 0.536 | 0.511 | 0.510 |
| | - polymer | 0.580 | 0.580 | 0.550 | 0.540 |

A further experiment was effected to simulate the affect of several film reclaim cycles on the appearance of the film. A sample of coated film was cut into chips, dried and re-extruded on to a cooling drum on which it was quenched to an amorphous film. This process was repeated for six extrusions, each having a dwell time at 250°–280° C. of 1.5 to 2.0 minutes. The visual appearance of the extrudate showed a gradual increase in yellowness but even the sixth extrudate was not excessively yellow.

The coated film exhibited excellent adhesion to lacquers containing light sensitive diazo compounds and cellulose acetate butyrate and cellulose acetate propionate.

I claim:

1. A process for the production of a synthetic linear polyester film which comprises melt extruding a substantially amorphous polyester film, drawing the film in the longitudinal direction, thereafter applying a primer coating comprising a thermosetting acrylic or methacrylic composition, wherein the acrylic or methacrylic component is crosslinkable, to one or both sides of said film, then drawing the coated film in the transverse direction, and heat setting the biaxially oriented and coated film, whereby a primer coating of the thermoset acrylic or methacrylic composition, wherein the acrylic or methacrylic component is thermoset, of thickness of at least $10^{-7}$ inch is obtained, and then recycling the coated film by re-extruding the same with fresh polyester.

2. A process according to claim 1, in which the coating composition comprises a polymer or copolymer of acrylic acid or methacrylic acid or their esters containing crosslinkable functional groups.

3. A process according to claim 2, in which the functional groups of the coating polymer or copolymer are crosslinked with an amine/formaldehyde condensation product.

4. A process according to claim 1, in which the film resulting from the extrusion of the recycled coated film and fresh polyester comprises up to 1.0% by weight of the thermosetting acrylic or methacrylic coating composition.

5. A process according to claim 2, in which said polymer or copolymer comprises ethyl acrylate and is admixed with the condensation product of an amine with formaldehyde.

6. A process according to claim 1, in which the synthetic linear polyester is polyethylene terephthalate.

7. A process according to claim 1, in which the film is drawn longitudinally before coating to about 3.5 times its original length and the coated film is then drawn transversely to about 3.5 times its original width and the thus drawn film is heat set at about 200° C.

8. A process according to claim 1, in which the film is drawn longitudinally at a temperature of 78° C. to 100° C. and transversely at a temperature of 80° C. to 125° C.

9. A process according to claim 1, in which the thermosetting acrylic or methacrylic composition is derived from a polymer or copolymer of acrylic acid or methacrylic acid containing hydroxy, carboxyl, amide or oxirane functional groups and an amine condensation product.

* * * * *